US011337780B1

(12) United States Patent
Moon et al.

(10) Patent No.: US 11,337,780 B1
(45) Date of Patent: May 24, 2022

(54) CLEAR ALIGNER ATTACHMENT SYSTEM AND METHOD

(71) Applicant: BIOTECH INNOVATIONS, INC., Norwalk, CA (US)

(72) Inventors: Won Moon, Los Angeles, CA (US); Ehab Abdelbar, Plano, TX (US); Ryoh Hamanaka, Los Angeles, CA (US); Paul Kim, Diamond Bar, CA (US)

(73) Assignee: Biotech Innovations, Inc., Norwalk, CA (US)

( * ) Notice: Subject to any disclaimer, the term of this patent is extended or adjusted under 35 U.S.C. 154(b) by 0 days.

(21) Appl. No.: 17/234,431

(22) Filed: Apr. 19, 2021

(51) Int. Cl.
*A61C 17/02* (2006.01)
*A61C 7/08* (2006.01)
*A61C 7/00* (2006.01)
*A61C 7/16* (2006.01)
*A61C 7/14* (2006.01)

(52) U.S. Cl.
CPC ............ *A61C 7/08* (2013.01); *A61C 7/006* (2013.01); *A61C 7/145* (2013.01); *A61C 7/16* (2013.01)

(58) Field of Classification Search
CPC .......... A61C 7/08; A61C 7/006; A61C 7/145; A61C 7/16; A61C 1/07; A61C 3/02; A61C 3/025; A61C 3/03; A61C 17/032; A61C 17/022; A61C 17/024; A61C 17/028; A61C 17/021; A61C 17/02; A61C 17/0202; A61C 1/0007
USPC .......................................................... 433/80
See application file for complete search history.

(56) References Cited

U.S. PATENT DOCUMENTS

| | | | | |
|---|---|---|---|---|
| 3,407,500 A * | 10/1968 | Kesling | ..................... | A61C 7/08 433/6 |
| 4,856,991 A * | 8/1989 | Breads | ..................... | A61C 7/08 433/6 |
| 5,035,613 A * | 7/1991 | Breads | ..................... | A61C 7/08 433/6 |
| 5,055,039 A * | 10/1991 | Abbatte | ..................... | A61C 7/08 433/24 |
| 5,059,118 A * | 10/1991 | Breads | ..................... | A61C 7/125 433/6 |
| 5,186,623 A * | 2/1993 | Breads | ..................... | A61C 7/08 433/214 |
| 5,971,754 A * | 10/1999 | Sondhi | ..................... | A61C 7/146 433/24 |
| 6,183,248 B1 * | 2/2001 | Chishti | ..................... | A61C 7/00 433/6 |
| 6,309,215 B1 * | 10/2001 | Phan | ..................... | A61C 7/00 433/24 |
| 6,514,074 B1 * | 2/2003 | Chishti | ..................... | A61C 7/00 433/24 |
| 6,554,611 B2 * | 4/2003 | Chishti | ..................... | A61C 7/00 433/6 |
| 6,554,613 B1 * | 4/2003 | Sachdeva | ..................... | A61C 7/00 433/24 |
| 6,705,863 B2 * | 3/2004 | Phan | ..................... | A61C 7/00 |
| 6,726,478 B1 * | 4/2004 | Isiderio | ..................... | A61C 7/00 433/69 |
| 6,783,360 B2 * | 8/2004 | Chishti | ..................... | A61C 7/00 433/6 |

(Continued)

*Primary Examiner* — Nicholas D Lucchesi
(74) *Attorney, Agent, or Firm* — Taylor English Duma LLP (57) ABSTRACT

The present invention discloses a clear orthodontic tray system and methods of making and using the same. The clear orthodontic tray system comprises pre-fabricated attachment device.

18 Claims, 8 Drawing Sheets

(56) References Cited

U.S. PATENT DOCUMENTS

| | | | |
|---|---|---|---|
| 6,830,450 B2* | 12/2004 | Knopp | A61C 7/00 433/6 |
| 7,059,850 B1* | 6/2006 | Phan | A61C 7/00 433/24 |
| 7,063,533 B2* | 6/2006 | Phan | A61C 7/00 433/24 |
| 7,077,647 B2* | 7/2006 | Choi | A61C 7/00 433/213 |
| 7,121,825 B2* | 10/2006 | Chishti | A61C 7/00 433/6 |
| 7,140,877 B2* | 11/2006 | Kaza | A61C 7/002 433/24 |
| 7,374,421 B2* | 5/2008 | Solomon | A61C 7/08 433/18 |
| 7,578,673 B2* | 8/2009 | Wen | A61C 7/146 433/24 |
| 7,648,360 B2* | 1/2010 | Kuo | A61C 7/08 433/6 |
| 7,658,610 B2* | 2/2010 | Knopp | A61C 7/146 433/24 |
| 7,771,195 B2* | 8/2010 | Knopp | A61C 7/08 433/6 |
| 7,819,659 B2* | 10/2010 | Wen | A61C 7/08 433/6 |
| 7,831,322 B2* | 11/2010 | Liu | A61C 8/0089 700/95 |
| 8,708,697 B2* | 4/2014 | Li | A61C 7/08 433/6 |
| 8,899,977 B2* | 12/2014 | Cao | A61C 7/08 433/24 |
| 8,936,464 B2* | 1/2015 | Kopelman | A61C 7/146 433/24 |
| 8,986,003 B2* | 3/2015 | Valoir | A61C 7/08 433/6 |
| 9,022,781 B2* | 5/2015 | Kuo | A61C 7/20 433/24 |
| 9,119,691 B2* | 9/2015 | Namiranian | A61C 7/10 |
| 9,498,302 B1* | 11/2016 | Patel | A61C 7/08 |
| 9,529,970 B2* | 12/2016 | Andreiko | G16H 40/63 |
| 10,045,835 B2* | 8/2018 | Boronkay | A61C 7/08 |
| 10,271,924 B1* | 4/2019 | Hoybjerg | A61C 7/006 |
| 10,548,700 B2* | 2/2020 | Fernie | A61C 7/146 |
| 2004/0157184 A1* | 8/2004 | Reising | A61C 7/14 433/8 |
| 2004/0219473 A1* | 11/2004 | Cleary | A61C 7/146 433/9 |
| 2006/0084026 A1* | 4/2006 | Cinader | A61C 7/146 433/24 |
| 2006/0093983 A1* | 5/2006 | Schultz | A61C 7/08 433/6 |
| 2006/0223021 A1* | 10/2006 | Cinader, Jr. | A61C 7/146 433/3 |
| 2007/0099146 A1* | 5/2007 | Reising | A61C 7/146 433/24 |
| 2010/0159413 A1* | 6/2010 | Kuo | B33Y 80/00 433/24 |
| 2014/0363779 A1* | 12/2014 | Kopelman | A61C 7/08 433/6 |
| 2019/0239983 A1* | 8/2019 | Matty | A61C 7/002 |
| 2019/0321136 A1* | 10/2019 | Martz | A61C 7/002 |
| 2020/0397537 A1* | 12/2020 | Raby | A61C 7/08 |

* cited by examiner

CLEAR ALIGNER ATTACHMENT SYSTEM AND METHOD

FIELD OF THE INVENTION

The present invention generally relates an orthodontic device and more specifically a device for clear aligner attachment system and methods of making and using thereof.

BACKGROUND OF THE INVENTION

Orthodontic clear aligner is getting popular because of its advantage of aesthetic and comfort. The following is the basic procedures of aligner orthodontic treatment:

a) a series of sequential orthodontic movements is digitally programmed;

b) a set of 3D printed models are produced based on the above digital data;

c) a set of thermoplastic sheets, e.g., polyethylene-based sheets or polyester sheets, covering snugly over the 3D printed models are produced by thermoform processing;

d) the processed sheets (clear aligners appliances) are trimmed and labeled for orthodontic treatment;

e) when a patient wears the above appliance in sequence, the digitally planned dental movements are expected.

This digitized orthodontic aligner design and fabrication and use thereof for orthodontic treatment is described in U.S. Pat. No. 5,975,893 to Chishti et al., the teachings of which are incorporated herein by reference in entirety.

However, the aligner appliances share inherent mechanical challenges in producing certain types of tooth movements: rotation of round shaped teeth, correction of severe torque or angulation, achieving large space closure, and producing intrusion or extrusion of certain teeth.

The above movements are even more challenging when the morphology of the teeth is short, pegged and/or round. This is largely due to its reliance on friction grip and morphological undercuts for fitting and tooth movements. Various types of attachment are employed in combination with clear aligners, in order to overcome the above problems and to apply required orthodontic force more efficiently. These attachments are placed on the tooth surface digitally, and the corresponding hollows are formed by molding their shape onto the 3D printed dental model where an aligner sheet is thermoformed over the digitally designed attachments. When these corresponding hollows are fitted over the attachments on tooth surfaces, not only they ensure proper fitting of the aligners, but also the difficult tooth movements mentioned above can be possible by producing necessary force vectors not possible without them, such as a force that is parallel to the tooth surface.

Figure 1:
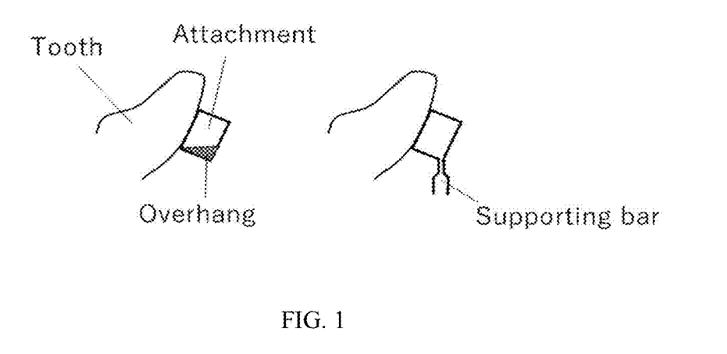
FIG. 1 illustrates prior art attachment of an aligner to a tooth surface. Since the overhanging portion of the attachment cannot be printed, a supporting bar is necessary during the printing process and removed before the fabrication of the aligner.

However, conventional attachments have several mechanical limitations and cause unwanted negative consequences:

1) Most of the 3D printers available have difficulty printing a shape with an overhanging structure because the printing is done in layers, and a temporary supporting bar is required for each overhanging structure which causes complexity in processing (FIG. 1) Therefore, the shape of attachment is largely limited by the ability of a 3D printer since the hollow is thermoformed over the 3D printed attachments on the model. This limitation of the attachment shape can reduce the efficacy and efficiency of the aligner treatment.

2) As an aligner is thermoformed over attachments, the adaptation of aligner material against attachments is not ideal, creating unwanted airspaces (FIG. 2) These spaces reduce the efficacy of force delivery.

3) The above gaps between an attachment and its corresponding hollow also worsens aesthetics. The interface between an aligner and airspace (FIG. 2-①) reflects lights coming from outside (FIG. 2-3) the aligner and creates silver colored region.

Figure 2:
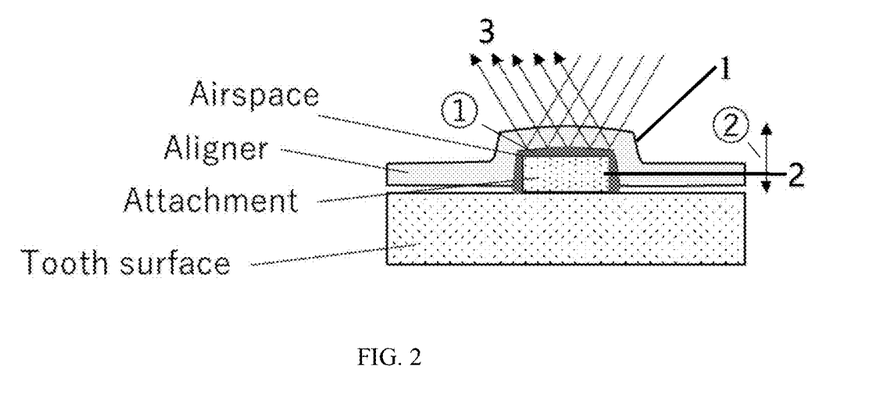
FIG. 2 depicts an aligner (1) that is covering a prior art attachment (2) on a tooth surface having light reflection against the aligner with airspaces. The interface between an aligner (1) and airspace (①) reflects lights (3) coming from outside the aligner and creates silver colored region. The attachment appears larger ((②)), and the total size of appliance increases.

4) Since entire attachment is covered by an aligner, the attachment appears larger, and the total size of appliance increases (FIG. 2-②).

Figure 3:
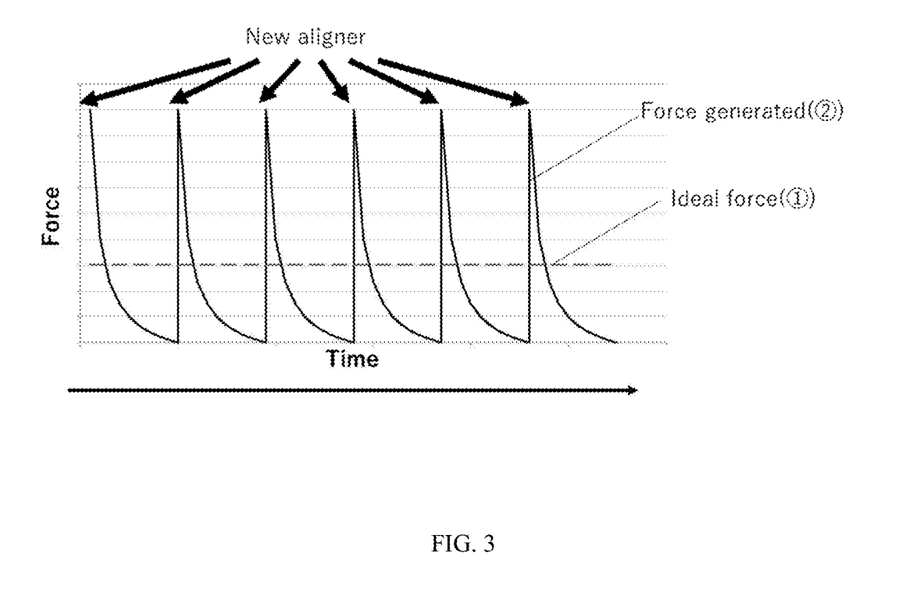
FIG. 3 illustrates the profile of an aligning force ((①)) on a tooth (strength-time curve) generated by aligner 1, and the profile of the desired force ((②)).

5) It is difficult to generate a continuous force, which is optimal for efficient tooth movements. An attachment is built on the tooth surface directly using light-cured resin which has greater hardness than an aligner sheet, which also is required to have a baseline stiffness in order to produce adequate force for tooth movements and arch stability. While an optimal continuous force over a long span is desired for efficient tooth movement (FIG. 3-①), this combination of the hard attachment and the stiff aligner sheet generates strong force when the aligner is inserted even for creating a tooth movement in small increment, but the force drops exponentially once the tooth moves in that small increment (FIG. 3-②) As a result, movement per each aligner tray is severely limited, and multiple trays are required for any significant tooth movement.

6) Since an attachment is covered by an aligner, the tooth movement in the outward direction is difficult to achieve.

Therefore, there is a need for new clear aligner attachment system and clear aligner comprising the same.

The embodiments below address the above described issues, needs, and/or objects.

SUMMARY OF THE INVENTION

In one aspect of the present invention, it is a clear orthodontic tray system, the system comprising:

a clear tray, and one or more pre-fabricated attachment device for attachment to surfaces of one or more teeth of a dental arch, wherein the clear tray comprises cavities configured to receive one or more teeth on the dental arch and one or more attachment sites, each attachment site corresponding to each pre-fabricated attachment device, and wherein the pre-fabricated attachment device comprises a design and shape configured to impart a prescribed aligning force on a tooth to which the attachment device is attached.

In some embodiments of the invention system, optionally in combination of any or all the various embodiments disclosed herein, the one or more attachment sites are formed by precision-cut such that the one or more attachment sites and the attachment devices generate no or substantially none airspaces between the clear tray and the attachment devices.

In some embodiments of the invention system, optionally in combination of any or all the various embodiments disclosed herein, the precision-cut is by a precision cutting device, e.g., laser cut device.

In some embodiments of the invention system, optionally in combination of any or all the various embodiments disclosed herein, the one or more attachment devices are configured to attach to the lingual surfaces of one or more tooth of the dental arch.

In some embodiments of the invention system, optionally in combination of any or all the various embodiments disclosed herein, the one or more attachment devices are embedded within the one or more cavities of the clear tray.

In some embodiments of the invention system, optionally in combination of any or all the various embodiments disclosed herein, the attachment is a removable attachment.

In some embodiments of the invention system, optionally in combination of any or all the various embodiments disclosed herein, the attachment is a magnetic attachment In some embodiments of the invention system, optionally in combination of any or all the various embodiments disclosed herein, the attachment comprises hard and/or soft attachments.

In some embodiments of the invention system, optionally in combination of any or all the various embodiments disclosed herein, the soft attachments are attachments to the surfaces of the one or more teeth, and the hard attachments are attachments to the one or more cavities of the clear tray.

In some embodiments of the invention system, optionally in combination of any or all the various embodiments disclosed herein, the soft and hard attachments can be placed on the surfaces of the one or more teeth and on the one or more cavities of the clear tray with any combination.

In another aspect of the present invention, it is a method of fabricating a clear orthodontic tray system, comprising selecting one or more pre-fabricated attachment devices for attachment to surfaces of one or more teeth of a dental arch, providing a clear tray, the clear tray comprising: a) cavities configured to receive one or more teeth on the dental arch and b) one or more attachment sites, each attachment site corresponding to each pre-fabricated attachment device, and attaching the one or more pre-fabricated attachment devices to the clear tray, wherein the each pre-fabricated attachment device comprises a design and shape configured to impart a prescribed aligning force on a tooth to which the attachment device is attached.

In some embodiments of the invention method, optionally in combination of any or all the various embodiments disclosed herein, the one or more attachment sites are formed by precision-cut such that the one or more attachment sites and the attachment devices generate no or substantially none airspaces between the clear tray and the attachment devices.

In some embodiments of the invention method, optionally in combination of any or all the various embodiments disclosed herein, the precision-cut can be achieved by any of precision cutting devices, e.g., a laser cut device.

In some embodiments of the invention method, optionally in combination of any or all the various embodiments disclosed herein, the one or more attachment devices are configured to attach to the lingual surfaces of one or more tooth of the dental arch.

In some embodiments of the invention method, optionally in combination of any or all the various embodiments disclosed herein, the one or more attachment devices are embedded within the one or more cavities of the clear tray.

In some embodiments of the invention method, optionally in combination of any or all the various embodiments disclosed herein, the attachment is a removable attachment.

In some embodiments of the invention method, optionally in combination of any or all the various embodiments disclosed herein, the attachment is a magnetic attachment.

In some embodiments of the invention method, optionally in combination of any or all the various embodiments disclosed herein, the attachment comprises hard and/or soft attachments.

In some embodiments of the invention method, optionally in combination of any or all the various embodiments disclosed herein, the soft attachments are attachments to the surfaces of the one or more teeth, and wherein the hard attachments are attachments to the one or more cavities of the clear tray.

In some embodiments of the invention system, optionally in combination of any or all the various embodiments disclosed herein, the soft and hard attachments can be placed on the surfaces of the one or more teeth and on the one or more cavities of the clear tray with any combination.

In some embodiments of the invention method, optionally in combination of any or all the various embodiments disclosed herein, the providing comprises forming the clear tray from a digitized dental arch representing a position of the tooth or teeth of the dental arch as prescribed by a prescription.

In some embodiments of the invention method, optionally in combination of any or all the various embodiments disclosed herein, the method further comprises forming a set of a plurality of the clear orthodontic tray systems according to a prescription, each clear orthodontic tray system corresponding to a position of the tooth or teeth of the dental arch as provided by the prescription.

In some embodiments of the invention method, optionally in combination of any or all the various embodiments disclosed herein, the position of the tooth or teeth is selected from the group consisting of an initial position of the tooth or teeth of the dental arch, an optional intermediate position of the tooth or teeth of the dental arch, and a final position of the tooth or teeth of the dental arch.

In a further aspect of the present invention, it is provided a method of orthodontic treatment on a human being in need thereof, comprising:

identifying an orthodontic condition on the human being, providing a set of a plurality of clear orthodontic tray systems according to the prescription, each clear orthodontic tray system corresponding to a position of the tooth or teeth of a dental arch as provided by the prescription, and applying the plurality of clear orthodontic tray systems according to the prescription;

wherein the position of the tooth or teeth is selected from the group consisting of an initial position of the tooth or teeth of the dental arch, an optional intermediate position of the tooth or teeth of the dental arch, and a final position of the tooth or teeth of the dental arch; and wherein each of the clear orthodontic tray systems comprises a clear tray, and one or more pre-fabricated attachment device for attachment to surfaces of one or more teeth of a dental arch, wherein the clear tray comprises cavities configured to receive one or more teeth on the dental arch and one or more attachment sites, each attachment site corresponding to each pre-fabricated attachment device, and wherein the pre-fabricated attachment device comprises a design and shape configured to impart a prescribed aligning force on a tooth to which the attachment device is attached.

In some embodiments of the invention method, the one or more attachment sites are formed by precision-cut such that the one or more attachment sites and the attachment devices generate no or substantially none airspaces between the clear tray and the attachment devices.

In some embodiments of the invention method, the precision-cut can be achieved by any of precision cutting devices, e.g., a laser cut device.

In some embodiments of the invention method, the one or more attachment devices are configured to attach to the lingual surfaces of one or more tooth of the dental arch.

In some embodiments of the invention method, the one or more attachment devices are embedded within the one or more cavities of the clear tray.

In some embodiments of the invention method, the attachment is a removable attachment.

In some embodiments of the invention method, the attachment is a magnetic attachment.

In some embodiments of the invention method, the attachment comprises hard and/or soft attachments.

In some embodiments of the invention method, the soft attachments are attachments to the surfaces of the one or more teeth, and the hard attachments are attachments to the one or more cavities of the clear tray.

In some embodiments of the invention system, optionally in combination of any or all the various embodiments disclosed herein, the soft and hard attachments can be placed on the surfaces of the one or more teeth and on the one or more cavities of the clear tray with any combination.

DETAILED DESCRIPTION OF THE INVENTION

Definitions

As used herein, the term soft attachment is used for any material with flexibility greater than the current resin-based material used for aligner treatments.

As used herein, the term hard attachment is used for any material with hardness property value similar to that of the current resin-based material As used herein, the term "tray" is used interchangeably with the term "aligner."

As used herein, the term "prescribed" or "prescription" refers to a corrected, aligned, or moved tooth/teeth positions after orthodontic treatment according to a prescription.

Clear Orthodontic Tray System

In one aspect of the present invention, it is a clear orthodontic tray system, the system comprising:
a clear tray, and
one or more pre-fabricated attachment device for attachment to surfaces of one or more teeth of a dental arch,
wherein the clear tray comprises cavities configured to receive one or more teeth on the dental arch and one or more attachment sites, each attachment site corresponding to each pre-fabricated attachment device, and
wherein the pre-fabricated attachment device comprises a design and shape configured to impart a prescribed aligning force on a tooth to which the attachment device is attached.

In some embodiments of the invention system, optionally in combination of any or all the various embodiments disclosed herein, the one or more attachment sites are formed by precision-cut such that the one or more attachment sites and the attachment devices generate no or substantially none airspaces between the clear tray and the attachment devices.

In some embodiments of the invention system, optionally in combination of any or all the various embodiments disclosed herein, the precision-cut can be achieved by any of precision cutting devices, e.g., a laser cut device.

In some embodiments of the invention system, optionally in combination of any or all the various embodiments disclosed herein, the one or more attachment devices are configured to attach to the lingual surfaces of one or more tooth of the dental arch.

In some embodiments of the invention system, optionally in combination of any or all the various embodiments disclosed herein, the one or more attachment devices are embedded within the one or more cavities of the clear tray.

In some embodiments of the invention system, optionally in combination of any or all the various embodiments disclosed herein, the attachment is a removable attachment.

In some embodiments of the invention system, optionally in combination of any or all the various embodiments disclosed herein, the attachment is a magnetic attachment In some embodiments of the invention system, optionally in combination of any or all the various embodiments disclosed herein, the attachment comprises hard and/or soft attachments.

In some embodiments of the invention system, optionally in combination of any or all the various embodiments disclosed herein, the soft attachments are attachments to the surfaces of the one or more teeth, and the hard attachments are attachments to the one or more cavities of the clear tray.

In some embodiments of the invention system, optionally in combination of any or all the various embodiments disclosed herein, the soft and hard attachments can be placed on the surfaces of the one or more teeth and on the one or more cavities of the clear tray with any combination.

In some embodiments, the disclosed attachment system can be described as follows, which include precision cutting of the aligners and prefabricated attachment devices (or alternatively simply referred to as "attachments" or as "attachment") and, optionally, attachment inside an aligner.

Precision Cutting of the aligners:

Traditional attachments are resin-based and attached to the teeth using a bonding template which is essentially a thin aligner with cavities corresponding to the negative indentations of the attachment, created from a 3D printed dental model with attachment design. The aforementioned cavities are filled with resin and then bonded to the teeth. As mentioned above, the shape of an attachment cannot have an overhanging structure, which carries negative implications mentioned above. To overcome such shortcomings, our disclosed system creates a precision hole (corresponding with a base of the chosen attachment) within the aligner tray, and the prefabricated attachment (see below) is attached to the tooth surface through the hole.

Figure 4:
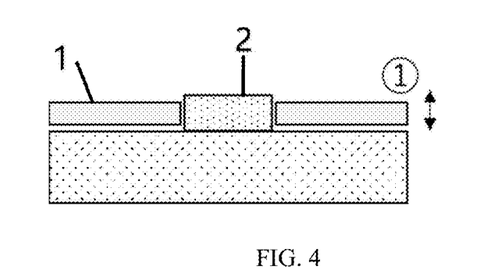
FIG. 4 shows an embodiment of the orthodontic attachment system having minimized airspace with thinner profile ① by placing an attachment (2) through the slot made by a precision cut of the aligner (1).
Figure 5:
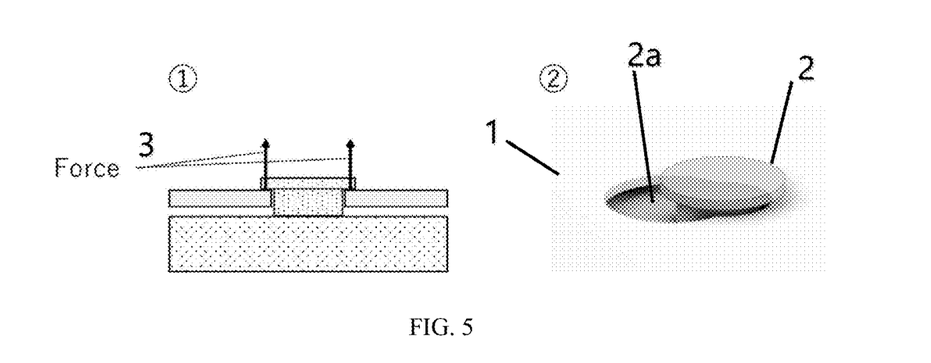
FIG. 5 shows an embodiment of the orthodontic attachment system where an example of an aligner (1) engaging the selective undercut (2, 2a) of an attachment for desired biomechanical requirements ((②)) By utilizing the overhanging undercut, an outward tooth movement ((①)) can be achieved by aligner force (3). By placing prefabricated attachments through the precision cut slots, the overhang issue during the printing process is eliminated.

Precision cutting (e.g., laser) of the aligner together with the prefabricated attachments can provide the following benefits:

a) An attachment with any shape including overhanging structure can be used for efficient biomechanics. The shape of attachment can influence efficiency and effectiveness of the tooth movements but they have been limited by the 3D printing capability. By using prefabricated attachments, the shape limitation can be overcome; however, a complex shaped attachment with deep undercut can become an obstacle for thermoformed aligner fabrication over the attachment. Fitting the prefabricated attachment through the precision cut in the aligner eliminates this problem.

b) The airspaces between attachments and aligners are minimized, and thus the force delivery becomes more effective (FIG. 4) as airspaces between attachments and aligners would cause aligning forces be mis-directed so as to be less effective.

c) The reduction in airspace and/or the use of lingual attachments can improve the aesthetics as such airspaces would have light indexes that are different from that of the aligner body and thus compromise the aesthetics of the aligner.

d) Since aligner does not cover the attachment, the size of attachment and the aligner size remain the same (FIG. 4-①).

e) An attachment with overhang can produce an outward tooth movement (FIG. 5-①). FIG. 5-② illustrates an example of an aligner 1 engaging the undercut of an attachment 2 via a hole or housing 2a. The locking scheme can vary, depending on the required force delivery, not limited to the illustration.

f) In addition, selective cutting of the aligner can be used to solve some of the inherent problems of traditional aligners such as posterior open bite which can be fixed by removing the occlusal surface of the posterior teeth.

Prefabricated Attachment:

Using prefabricated attachments provides the following benefits over traditional resin-based attachments.

Figure 6A:
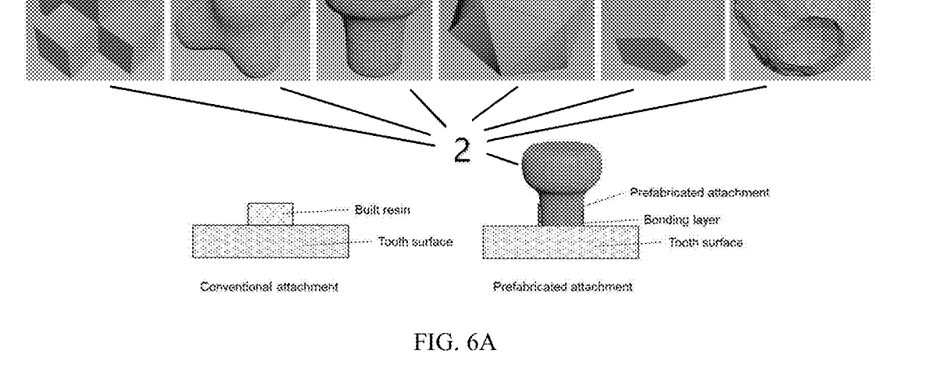
FIG. 6A shows embodiments of various pre-fabricated attachment devices in various shapes, some with overhanging structures.

Variation in Shape (FIG. 6A):

Any shape of attachments, even with overhanging structure, can be utilized without the limitation of the 3D printer's capacity since the attachment is not printed with the dental model. This variation in shape can be applied on each tooth individually based on the desired movement and force application. This is an important technical feature as by designing and using attachment of different shapes, one can achieve a desired tooth movement as shape of attachment would cause the aligning force to direct at a desired direction so as to achieve the desired tooth movement.

Figure 6B:
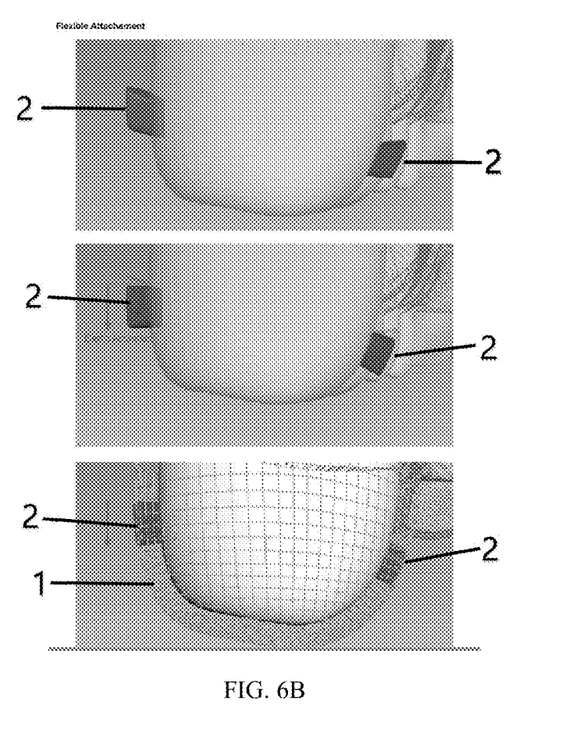
FIG. 6B illustrates embodiments of flexible attachments (2) to tooth surfaces that can aid in tooth movement by generating more continuous force (red arrow) when combined with an aligner (1).

Variation in Material Property (FIG. 6B):

Since prefabricated attachment can be produced with any material, the physical property of attachment can be customized for a desired effect. This variation in material can be applied on each tooth individually based on the desired movement and force application. A material with inherent elastic properties such as Silicone or an elastic structure (e.g., NiTi or SS—short for stainless steel—springs) can provide a large span of elastic temporary deformation and generate a light continuous force for more efficient orthodontic treatment with a reduced number of aligners.

Figure 6C:
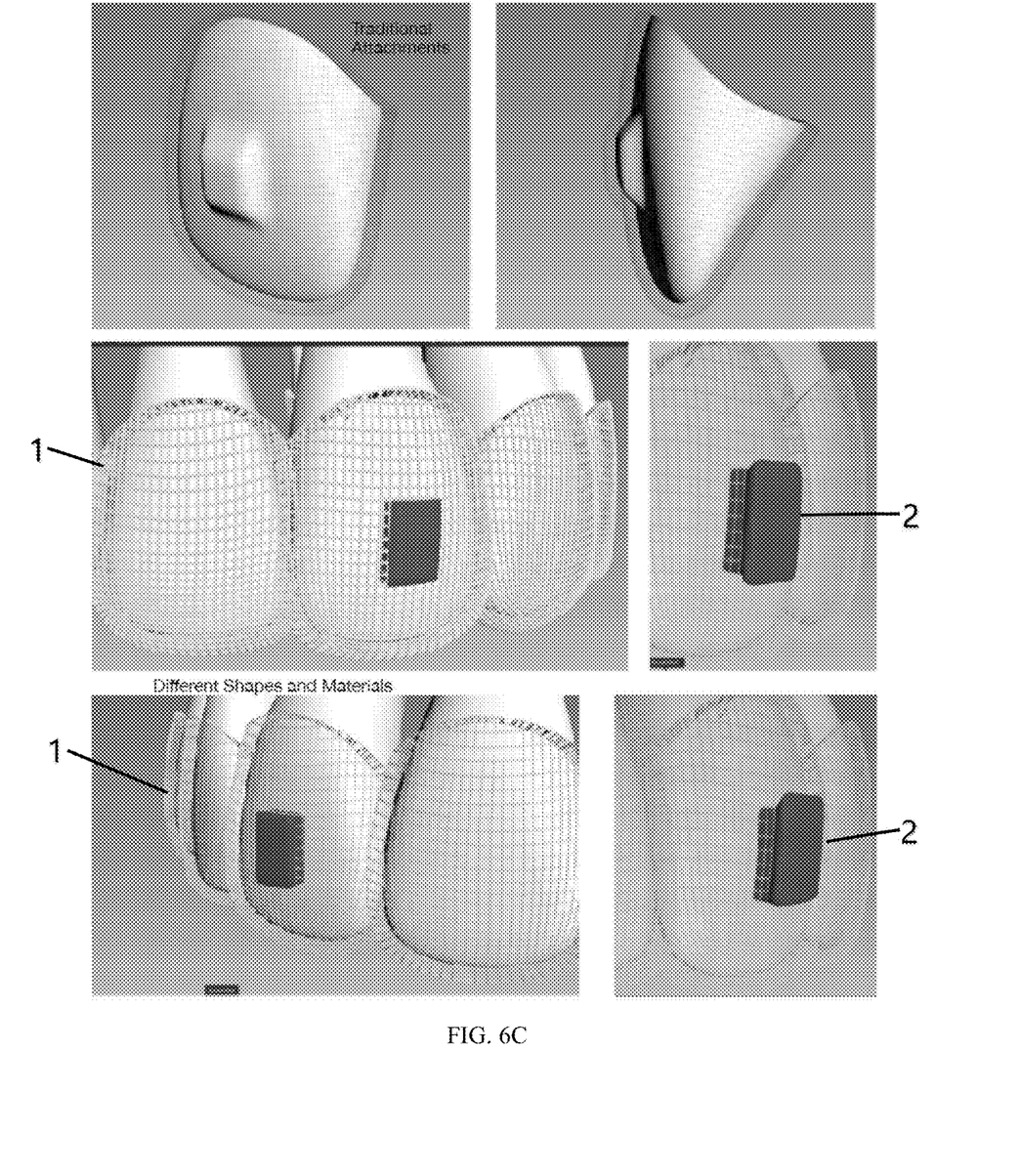
FIG. 6C illustrate embodiments of attachments via pre-fabricated devices of the clear orthodontic tray to tooth surfaces. The difference between 3D printed attachments which is embodied by an aligner and prefabricated attachments with overhangs (2) delivered through the precision cut slots on an aligner (1) is illustrated.

Attachment Delivery (FIG. 6C):

In some embodiments, our disclosed system uses a templet aligner which has corresponding shaped holes to the base of attachments to bond various prefabricated attachments to the tooth surface.

Figure 6D:
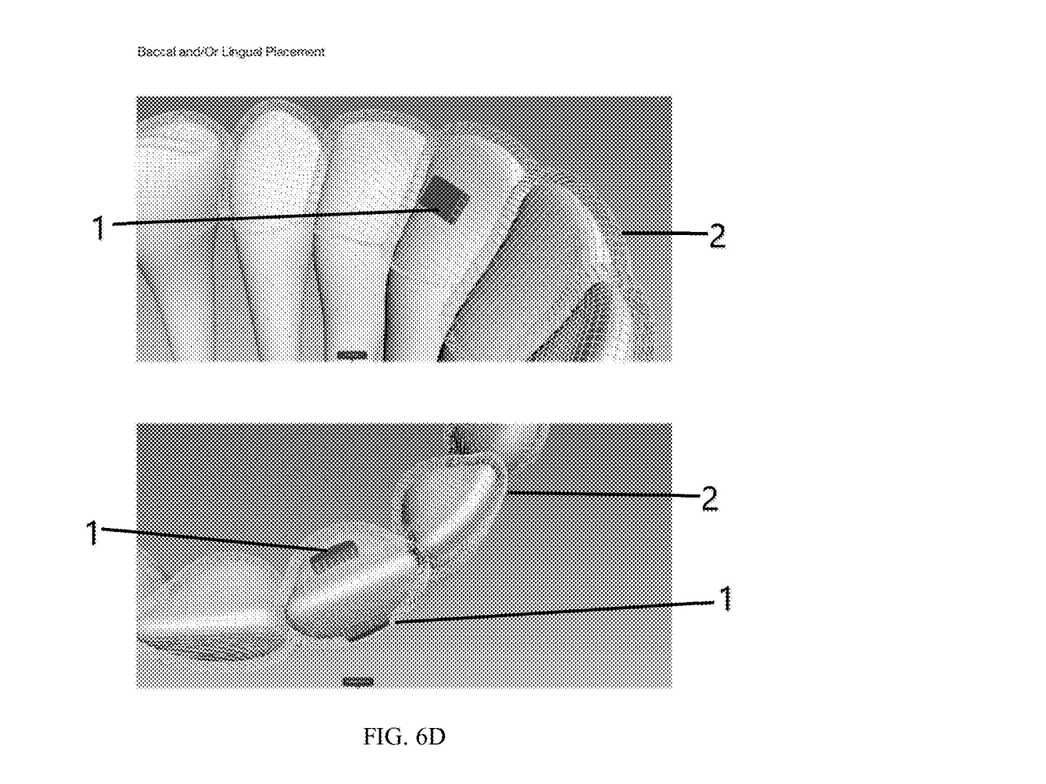
FIG. 6D illustrate embodiments of attachments via pre-fabricated devices of the clear orthodontic tray to tooth surfaces: the lingual and labial attachments (2) through an aligner (1).

Using Attachments on the Lingual Surface (FIG. 6D):

The lingual surface is the inner surface of the teeth facing the patient's tongue rather than the Buccal surface facing the outside lips and cheeks. Traditional attachments are placed on the buccal surface but rarely on the lingual surface for many reasons one of them being difficult to isolate the lingual part of the lower teeth from moisture which is crucial for successful bonding of the resin to the tooth surface. Another reason is comfort, as the tongue is sensitive to sharp objects and can be easily irritated by attachment with sharp corners. The disclosed prefabricated attachment can avoid the above problems by ease of bonding and versatile attachment design. Lingual attachments have a decisive aesthetic advantage over the labial ones.

Attachment Inside the Aligner:

Other embodiments of the disclosed system are combining the attachment to the aligner so that it becomes removable with the aligner and not bonded to the tooth surface.

Figure 7A:
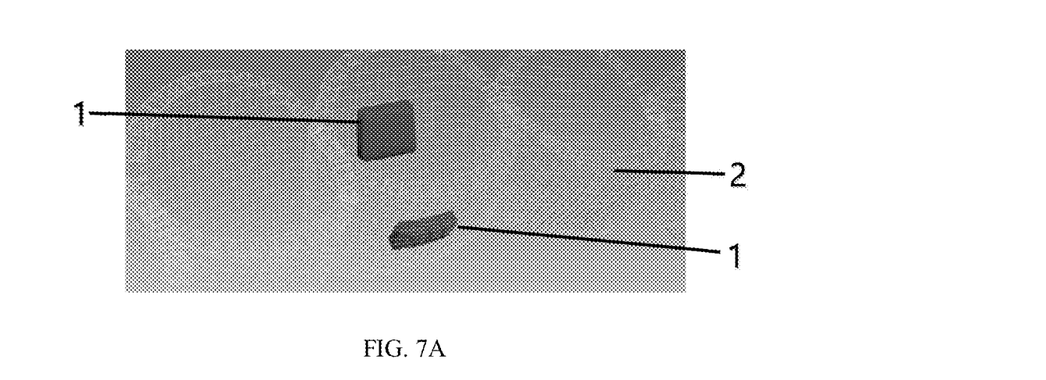
FIG. 7A illustrates embodiments of attachments (2) to the clear orthodontic tray(1).

An attachment with various mechanical properties can be placed inside the aligner to produce force applications not possible with the traditional system (FIG. 7A). When a flexible attachment is placed inside the aligner, the attachment will be squeezed as the aligner is seated which creates a pushing force against the corresponding tooth (FIG. 7B).

Figure 7B:
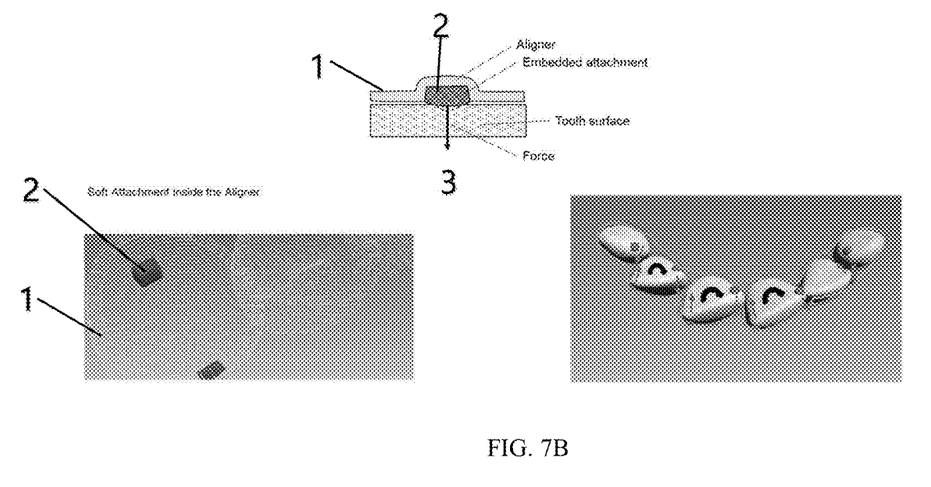
FIG. 7B illustrates embodiments of attachments (2) to the clear orthodontic tray (1), which produces a selective force on a tooth surface (3). By combining labial and lingual attachments inside the clear orthodontic tray and applying selective force vectors (red arrows), a precise tooth movement is possible (black circular arrows).

Various force vectors can be created by selecting appropriate attachment materials in proper attachment sites within the aligner (FIG. 7B).

As used herein, the term "flexible attachment" can be used interchangeably with the term "soft attachment."

Figure 7C:
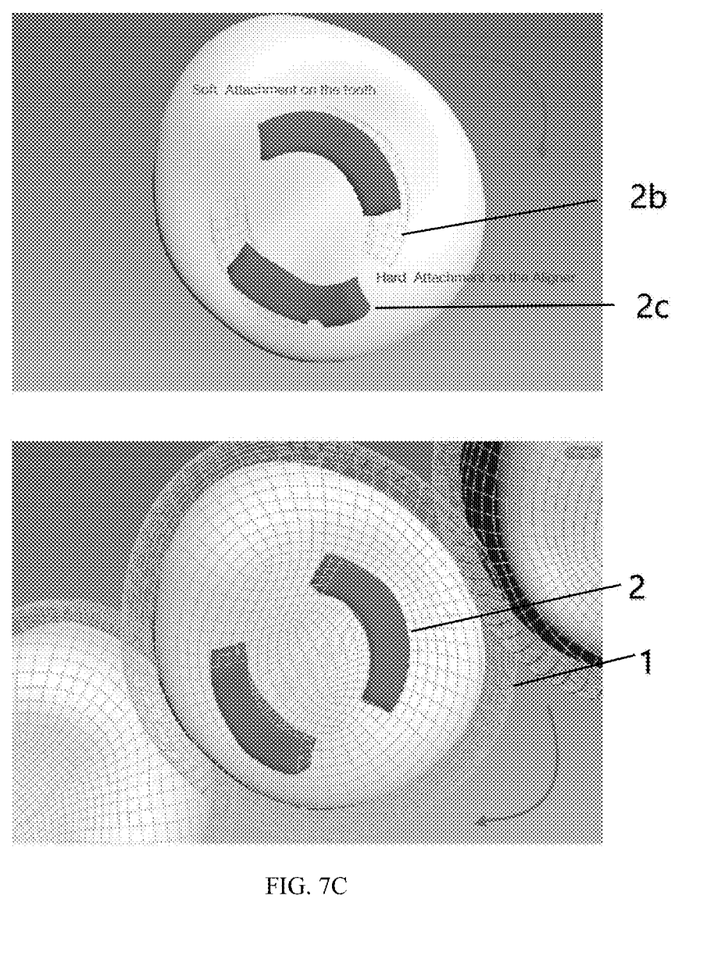
FIGS. 7C and 7D illustrate embodiments of the clear orthodontic tray system having hard and soft attachment combinations.
Figure 7D:
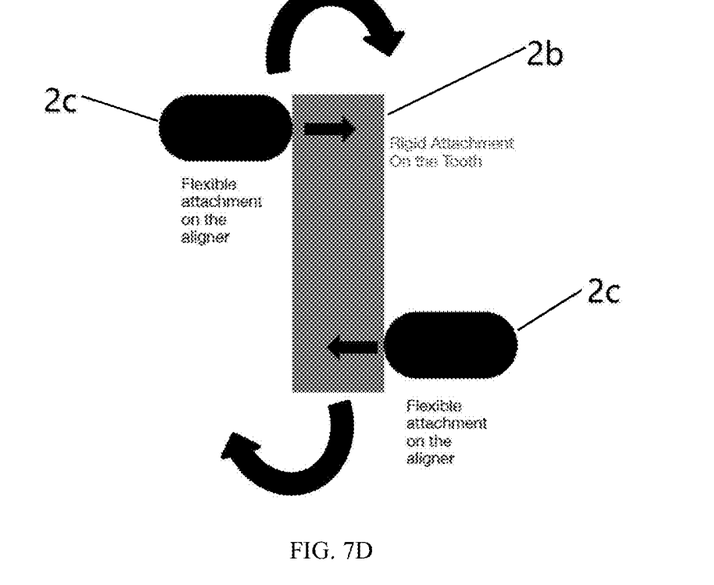

Attachment Interaction: The attachments inside the aligner and the ones on the dentitions can work together to produce the desired tooth movements (FIG. 7C, D). This action can be facilitated in many ways: key-lock, magnetic action, etc.

The disclosed attachment system not only provides solutions for the initial problems discussed but also makes other difficult tooth movements possible.

Methods of Fabrication

In another aspect of the present invention, it is a method of fabricating a clear orthodontic tray system, comprising selecting one or more pre-fabricated attachment devices for attachment to surfaces of one or more teeth of a dental arch, providing a clear tray, the clear tray comprising: a) cavities configured to receive one or more teeth on the dental arch and b) one or more attachment sites, each attachment site corresponding to each pre-fabricated attachment device, and attaching the one or more pre-fabricated attachment devices to the clear tray, wherein the each pre-fabricated attachment device comprises a design and shape configured to impart a prescribed aligning force on a tooth to which the attachment device is attached.

In some embodiments of the invention method, optionally in combination of any or all the various embodiments disclosed herein, the one or more attachment sites are formed by precision-cut such that the one or more attachment sites and the attachment devices generate no or substantially none airspaces between the clear tray and the attachment devices.

In some embodiments of the invention method, optionally in combination of any or all the various embodiments disclosed herein, the precision-cut can be achieved by any of precision cutting devices, e.g., a laser cut device.

In some embodiments of the invention method, optionally in combination of any or all the various embodiments disclosed herein, the one or more attachment devices are configured to attach to the lingual surfaces of one or more tooth of the dental arch.

In some embodiments of the invention method, optionally in combination of any or all the various embodiments disclosed herein, the one or more attachment devices are embedded within the one or more cavities of the clear tray.

In some embodiments of the invention method, optionally in combination of any or all the various embodiments disclosed herein, the attachment is a removable attachment.

In some embodiments of the invention method, optionally in combination of any or all the various embodiments disclosed herein, the attachment is a magnetic attachment.

In some embodiments of the invention method, optionally in combination of any or all the various embodiments disclosed herein, the attachment comprises hard and/or soft attachments.

In some embodiments of the invention method, optionally in combination of any or all the various embodiments disclosed herein, the soft attachments are attachments to the surfaces of the one or more teeth, and wherein the hard attachments are attachments to the one or more cavities of the clear tray.

In some embodiments of the invention method, optionally in combination of any or all the various embodiments disclosed herein, the soft and hard attachments can be placed on the surfaces of the one or more teeth and on the one or more cavities of the clear tray with any combination.

In some embodiments of the invention method, optionally in combination of any or all the various embodiments disclosed herein, the providing comprises forming the clear tray from a digitized dental arch representing a position of the tooth or teeth of the dental arch as prescribed by a prescription.

In some embodiments of the invention method, optionally in combination of any or all the various embodiments disclosed herein, the method further comprises forming a set of a plurality of the clear orthodontic tray systems according to a prescription, each clear orthodontic tray system corresponding to a position of the tooth or teeth of the dental arch as provided by the prescription.

In some embodiments of the invention method, optionally in combination of any or all the various embodiments disclosed herein, the position of the tooth or teeth is selected from the group consisting of an initial position of the tooth or teeth of the dental arch, an optional intermediate position of the tooth or teeth of the dental arch, and a final position of the tooth or teeth of the dental arch.

Method of Use

In a further aspect of the present invention, it is provided a method of orthodontic treatment on a human being in need thereof, comprising:

identifying an orthodontic condition on the human being, providing a set of a plurality of clear orthodontic tray systems according to the prescription, each clear orthodontic tray system corresponding to a position of the tooth or teeth of a dental arch as provided by the prescription, and applying the plurality of clear orthodontic tray systems according to the prescription;

wherein the position of the tooth or teeth is selected from the group consisting of an initial position of the tooth or teeth of the dental arch, an optional intermediate position of the tooth or teeth of the dental arch, and a final position of the tooth or teeth of the dental arch; and wherein each of the clear orthodontic tray systems comprises a clear tray, and one or more pre-fabricated attachment device for attachment to surfaces of one or more teeth of a dental arch, wherein the clear tray comprises cavities configured to receive one or more teeth on the dental arch and one or more attachment sites, each attachment site corresponding to each pre-fabricated attachment device, and wherein the pre-fabricated attachment device comprises a design and shape configured to impart a prescribed aligning force on a tooth to which the attachment device is attached.

In some embodiments of the invention method, the one or more attachment sites are formed by precision-cut such that the one or more attachment sites and the attachment devices generate no or substantially none airspaces between the clear tray and the attachment device.

In some embodiments of the invention method, the precision-cut can be achieved by any of precision cutting devices, e.g., a laser cut device.

In some embodiments of the invention method, the one or more attachment devices are configured to attach to the lingual surfaces of one or more tooth of the dental arch.

In some embodiments of the invention method, the one or more attachment devices are embedded within the one or more cavities of the clear tray.

In some embodiments of the invention method, the attachment is a removable attachment.

In some embodiments of the invention method, the attachment is a magnetic attachment.

In some embodiments of the invention method, the attachment comprises hard and/or soft attachments.

In some embodiments of the invention method, the soft attachments are attachments to the surfaces of the one or more teeth, and the hard attachments are attachments to the one or more cavities of the clear tray.

In some embodiments of the invention method, optionally in combination of any or all the various embodiments disclosed herein, the soft and hard attachments can be placed on the surfaces of the one or more teeth and on the one or more cavities of the clear tray with any combination.

Figure 8:
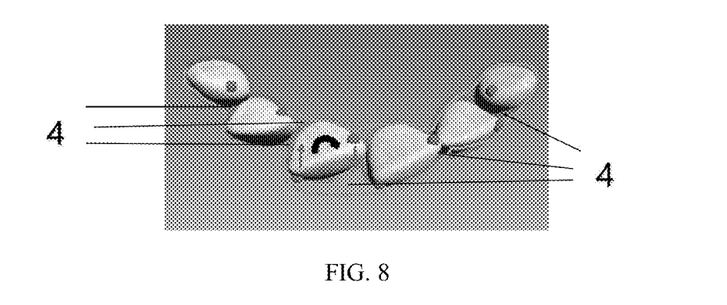
FIG. 8 illustrates an embodiment of the disclosed method where a space is created on a site opposite to the attachment of clear tray to tooth/teeth.

In some embodiments of the invention method, optionally in combination of any or all the various embodiments disclosed herein, the method further comprises digitally creating a void between the clear tray and the tooth surface on an opposite side of the attachment to allow tooth to move into a prescribed space, 4, and promote more efficient tooth movements (FIG. 8).

Those skilled in the art will know, or be able to ascertain, using no more than routine experimentation, many equivalents to the specific embodiments of the invention described herein. These and all other equivalents are intended to be encompassed by the following claims.

We claim:

1. A set of a plurality of clear orthodontic tray systems, each clear orthodontic tray system comprising
    a clear tray, and
    one or more pre-fabricated attachment devices for attachment to surfaces of one or more teeth of a dental arch,
    wherein the clear tray comprises cavities configured to receive one or more teeth on the dental arch and one or more attachment sites, each attachment site corresponding to each pre-fabricated attachment device,
    wherein each pre-fabricated attachment device comprises a design and shape configured to impart a prescribed aligning force on a tooth to which the attachment device is attached,
    wherein the one or more attachment devices are embedded within the cavities of the clear tray prior to attachment to the surfaces of the one or more teeth of a dental arch, and
    wherein the one or more pre-fabricated attachment devices are configured to directly contact the tooth or the one or more teeth when the appliance is initially applied to the dental arch,
    wherein the one or more attachment sites are formed by precision-cut such that the one or more attachment sites and the one or more attachment devices generate no or substantially none airspaces between the clear tray and the one or more attachment devices,
    wherein the set of a plurality of the clear orthodontic tray systems is formed according to a prescription, each clear orthodontic tray system corresponding to a position of the one or more teeth of the dental arch as provided by the prescription, and
    wherein the one or more attachment devices are magnetic attachment devices.

2. The set of a plurality of clear orthodontic tray systems according to claim 1, wherein precision-cut is by a precision cutting device.

3. The set of a plurality of clear orthodontic tray systems according to claim 1, wherein the one or more attachment devices are configured to attach to the lingual surfaces of one or more teeth of the dental arch.

4. The set of a plurality of clear orthodontic tray systems according to claim 1, wherein the one or more attachment devices are removable attachment devices.

5. The set of a plurality of clear orthodontic tray systems according to claim 1, wherein the attachment devices are adapted to be placed on the surfaces of the one or more teeth, the cavities of the clear tray or a combination thereof.

6. A method of fabricating a clear orthodontic tray system, comprising
    selecting one or more pre-fabricated attachment devices for attachment to surfaces of one or more teeth of a dental arch,
    providing a clear tray, the clear tray comprising: a) cavities configured to receive one or more teeth on the dental arch and b) one or more attachment sites, each attachment site corresponding to each pre-fabricated attachment device,
    attaching the one or more pre-fabricated attachment devices to the clear tray, and
    forming a set of a plurality of the clear orthodontic tray systems according to a prescription, each clear orthodontic tray system corresponding to a position of the one or more teeth of the dental arch as provided by the prescription,
    wherein the each pre-fabricated attachment device comprises a design and shape configured to impart a prescribed aligning force on a tooth to which the attachment device is attached,
    wherein the one or more attachment devices are embedded within the cavities of the clear tray prior to attachment to the surfaces of the one or more teeth of a dental arch,
    wherein the one or more pre-fabricated attachment devices are configured to directly contact the tooth or the one or more teeth when the appliance is initially applied to the dental arch,
    wherein the one or more attachment sites are formed by precision-cut such that the one or more attachment sites and the one or more attachment devices generate no or substantially none airspaces between the clear tray and the one or more attachment devices, and
    wherein the one or more attachment devices are magnetic attachment devices.

7. The method according to claim 6, wherein precision-cut is by a precision cutting device.

8. The method according to claim 6, wherein the one or more attachment devices are configured to attach to the lingual surfaces of one or more teeth of the dental arch.

9. The method according to claim 6, wherein the one or more attachment devices are removable attachment devices.

10. The method according to claim 6, wherein the attachment devices are placed on the surfaces of the one or more teeth, the cavities of the clear tray or a combination thereof.

11. The method according to 6, wherein providing comprises forming the clear tray from a digitized dental arch representing a position of the one or more teeth of the dental arch as prescribed by a prescription.

12. A method of orthodontic treatment on a human being in need thereof, comprising:
    identifying an orthodontic condition on the human being, providing a set of a plurality of clear orthodontic tray systems according to a prescription, each clear orthodontic tray system corresponding to a position of tooth or teeth of a dental arch as provided by the prescription, and applying the plurality of clear orthodontic tray systems according to the prescription;

wherein the position of the tooth or teeth is selected from the group consisting of an initial position of the tooth or teeth of the dental arch, an optional intermediate position of the tooth or teeth of the dental arch, and a final position of the tooth or teeth of the dental arch; and wherein each of the clear orthodontic tray systems comprises
  a clear tray, and
  one or more pre-fabricated attachment devices for attachment to surfaces of one or more teeth of a dental arch, wherein the clear tray comprises cavities configured to receive one or more teeth on the dental arch and one or more attachment sites, each attachment site corresponding to each pre-fabricated attachment device, wherein each pre-fabricated attachment device comprises a design and shape configured to impart a prescribed aligning force on a tooth to which the attachment device is attached, wherein the one or more attachment devices are embedded within the cavities of the clear tray prior to attachment to the surfaces of the one or more teeth of a dental arch, wherein the one or more pre-fabricated attachment devices are configured to directly contact the tooth or the one or more teeth when the appliance is initially applied to the dental arch, and wherein the one or more attachment devices are magnetic attachment devices.

13. The method according to claim 12, wherein the one or more attachment sites are formed by precision-cut such that the one or more attachment sites and the one or more attachment devices generate no or substantially none airspaces between the clear tray and the attachment device.

14. The method according to claim 13, wherein precision-cut is by a precision cutting device.

15. The method according to claim 12, wherein the one or more attachment devices are configured to attach to the lingual surfaces of one or more teeth of the dental arch.

16. The method according to claim 12, wherein the attachment is a removable attachment.

17. The method according to claim 12, wherein the attachment devices are placed on the surfaces of the one or more teeth, the cavities of the clear tray or a combination thereof.

18. The method according to claim 12, further comprising digitally creating a void between the clear tray and surface of the tooth on an opposite side of the one or more attachment devices to allow teeth to move into a prescribed space and promote more efficient tooth movements.

* * * * *